United States Patent [19]

Riley

[11] Patent Number: 4,635,158

[45] Date of Patent: Jan. 6, 1987

[54] FILTERING TRANSIENT VOLTAGE SUPPRESSION DEVICE ASSEMBLY

[75] Inventor: Leon H. Riley, Huntsville, Ala.

[73] Assignee: The United States of America as represented by the Secretary of the Army, Washington, D.C.

[21] Appl. No.: 801,024

[22] Filed: Nov. 22, 1985

[51] Int. Cl.⁴ .............................................. H02H 9/04
[52] U.S. Cl. ..................................... 361/111; 361/127
[58] Field of Search ............... 361/111, 117, 119, 126, 361/127, 394, 1, 113; 337/28, 29, 32, 33, 34

[56] References Cited

U.S. PATENT DOCUMENTS 4,326,232  4/1982  Nishiwaki ........................... 361/127

*Primary Examiner*—A. D. Pellinen
*Assistant Examiner*—H. L. Williams
*Attorney, Agent, or Firm*—Freddie M. Bush; Robert C. Sims

[57] ABSTRACT

This filtering transient voltage suppression device assembly adequately provides for filtering of electrical noise and transients. It also provides a circuit with reduced parasitic inductance of the voltage suppression device (VSD). It provides for connector units to be mounted in planes at each end of the assembly. This mounting arrangement enables bulkhead mounting of the FTVSDA. Filters and VSD's are connected, in a low parasitic inductance fashion, between leads interconnecting separate connector pins and the body of the device. A mounting plate inside the device provides structure and electrical connections for assembly, as well as easy access.

6 Claims, 3 Drawing Figures

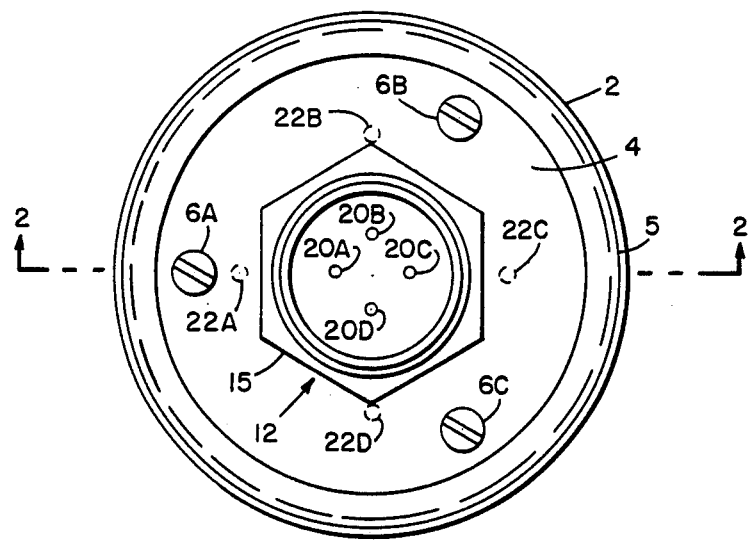
FIG. 1
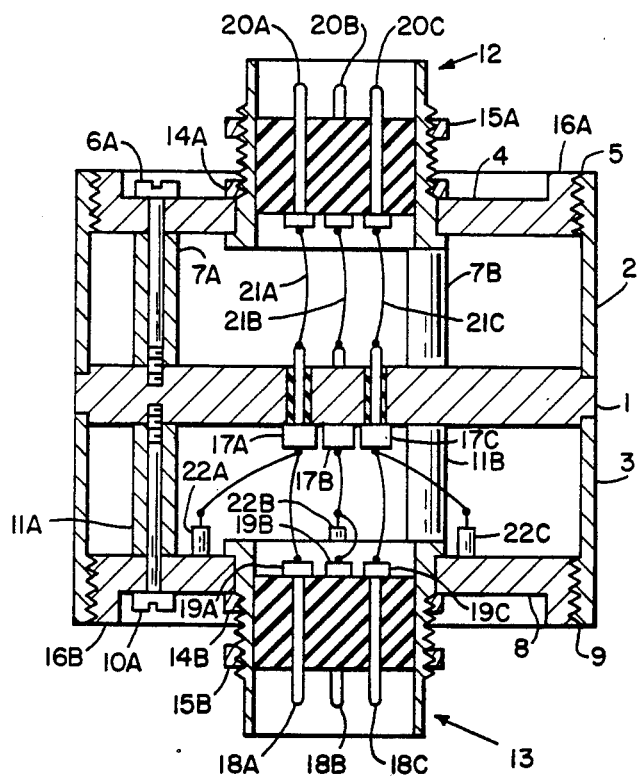
FIG. 2
FIG. 3

FILTERING TRANSIENT VOLTAGE SUPPRESSION DEVICE ASSEMBLY

DEDICATORY CLAUSE

The invention described herein may be manufactured, used, and licensed by or for the Government for governmental purposes without the payment to me of any royalties thereon.

RELATED PATENT APPLICATIONS

U.S. Pat. applications Ser. No. 778,941 filed Sept. 23, 1985, and Ser. No. 797,345 filed Nov. 12, 1985, are copending.

BACKGROUND OF THE INVENTION

Present Filtering Transient Voltage Suppression Device Assemblies (FTVSDA) do not adequately provide for maintenance. The filters and other voltage suppression device (VSD's) such as semiconductors and variable resistance devices are buried in the assembly and not accessible for maintenance. This invention provides a FTVSDA with ready access to filters and VSD's. This FTVSDA also provides for suppression of radio and radar interference.

This invention has the following advantages over previous assemblies of this type.

1. Assembly and maintenance of the FTVSDA is simplified by providing access into the interior of the assembly after removing one or two covers.
2. The assembly is of simple design and requires few parts.
3. The assembly provides for effective installation of multiple VSD's. Filtering, semiconductor, gas discharge and variable resistance devices may be installed in any combination on any of the circuits passing through the FTVSDA.
4. The assembly provides for highly effective filtering. The FTVSDA input and output has good electrical isolation which is necessary for efficient filtering.

SUMMARY OF THE INVENTION

This Filtering Transient Voltage Suppression Device Assembly (FTVSDA) is a feedthrough device which adequately provides for filtering of electrical noise and transients. It also provides a circuit with reduced parasitic inductance of the voltage suppression device (VSD). This FTVSDA provides for connector units to be mounted in planes at each end of the assembly. This mounting arrangement enables bulkhead mounting of the FTVSDA. Filters and VSD's are connected, in a low parasitic inductance fashion, between leads interconnecting separate connector pins and the body of the FTVSDA. A mounting plate provides structure and electrical connections for assembly, as well as easy access.

BRIEF DESCRIPTION OF THE DRAWINGS

FIG. 1 is a top view of the present invention.

FIG. 2 is a side view of FIG. 1 taken along section lines A—A.

FIG. 3 is a schematic showing of the connections of the filter.

DESCRIPTION OF THE BEST MODE AND PREFERRED EMBODIMENT

The FTVSDA and its operation is described in the following discussion and attached figures.

FIGS. 1 and 2 show a FTVSDA, side view and top view. A section A—A of the side view is shown to provide greater clarity. Refering to the Figures, the following is a description of the FTVSDA.

A filter mounting plate (FMP) 1 is located in the middle of the FTVSDA. The FMP 1 is slotted to accept a cylindrical upper cover (UC) 2 and a cylindrical lower cover (LC) 3. The circular Upper Base Plate (UBP) 4 has a thread connection 5 to accept the UC 2. Advancing this connection 5 causes compression between 1 and 2 that provides electrical conduction at this joint. This compression is transferred as tension to the UBP 4 connecting screws 6A-6C. Spacing between UBP 4 and the FMP 1 is accurately maintained by tube stand off's 7A-7C.

The lower section of the FTVSDA is assembled in a fashion similar to that described for the upper section. The Lower Base Plate(LBP) 8 has a thread connection 9 to accept the LC 3. Advancing this connection 9 causes compression between 1 and 3 that provides electrical conduction at this joint. This compression is transferred as tension to the LBP 8 connecting screws 10A-10C. Spacing between base LBP 8 and FMP 1 is accurately maintained by tube stand off's 11A-11C.

Jam nut connectors 12 and 13 are shown passing through the UBP 4 and LBP 5. These are designated Upper Connector UCO 12 and Lower connector LCO 13. Jam nuts 14A and 14B are shown fastening UCO 12 to UBP 4 and LCO 13 to LBP 8. Flange mount or other type connectors may be used.

Second jam nuts 15A and 15B are provided for attaching the FTVSDA to the bulkhead for feedthrough utilization or to any system common (ground) fixture. The bulkhead or fixture is grasped between the jam nuts 15A and 15B and the flat exterior ring 16A of the UBP 4 or ring 16B of the LBP 8. Other type mounting fixtures may be utilized. The FTVSDA may be drilled and taped at any location for attachment of system common (ground) and mounting straps. Filters 17A-17D are shown mounted in the FMP 1 and interconnected to LCO 13 pins 18A-18D by wiring 19A-19D and the UCO 12 pins 20A-20D through wiring 21A-21D. The FTVSDA can handle any number of circuits. This description shows 4 pin connectors capable of 4 circuits.

Electrical operation may be described by following one of the circuits. Assume that the LCO 13 is the input connector and UCO 12 is the output connector. Normal operation provides passage of electrical current through a LCO 13 pin 18, through wiring 19, to a filter 17, through wiring 21, to a UCO 12 pin 20. Normally the filter 17 would not electrically influence the circuit but if radio frequency, radar frequncy, or high rate of rise and/or fall electrical transients are in the input circuit they will be reduced by the filter and circuits downstream of the filter will be protected. Shunted electrical energy is transfered from the filters 17A-17D to fixtures electrical attaching the FTVSDA to system common or ground through 1, 3, 10, 11 and 8. LBP is connected to ground or a common connection.

FIG. 3 shows one possible circuit the filters 17 can take. The inductance part is connected in series while the capacitance 31 is connected to shunt the current to plate 1.

Addition of over-voltage VSD's such as semiconductor, variable resistance, and gas discharge as circuit voltage limiters to work in conjunction with filtering may be added and is highly desirable in many applications of the FTVSDA. The operation of over-voltage VSD's sometimes creates electromagnetic interference that the filter will remove and thereby enable downstream electronic circuits to operate through high voltage transient exposure at the input connector of the FTVSDA.

Installation of filtering and over-voltage VSD's is also shown in FIGS. 1 and 2. The over-voltage suppression device 22A-22D are shown connecting the filter wiring to the LBP 8. Attachment to the LBP 8 is optional to any other part of the FTVSDA that provides a good electrical path to ground. If an over-voltage occurs on wiring 19 the overvoltage suppression devices 22 will change impedance and shunt electrical energy away from 19 thereby protecting the electrical circuits. The shunted electrical energy finds a previously described path to system common. Any electrical interference created during overvoltage operation of 22 is filtered by 17 and not allowed to pass into downstream electrical circuits.

I claim:

1. A filtering transient electrical suppression device comprising first, second and third electrical conductive plates; first and second enclosure means attached to said plates so as to create at least one protected enclosure between said plates; said enclosure means electrically connecting said plates; at least one connector having an electrical path passing from outside said enclosure through said first plate to inside said enclosure and back outside through said third plate; filter means equal in number to the number of conductors for protecting against transient rate of rise and fall current flow; said filter means being mounted to said second plate; and each filter means being electrically connected respectively to one conductor inside said enclosure so as to prevent transient electrical energy in the conductor from passing outside the device by way of the conductor when a transient condition occurs.

2. A device as set forth in claim 1 further comprising a plurality of conductors of at least four in number; each electrical conductive plate having an opening therethrough; insulation means provided in each opening; and said plurality conductors passing through said insulation means so as to provide for connections inside said enclosure by said filter means.

3. A device as set forth in claim 2 wherein said first, second and third electrically conductive plates are located at different planes.

4. A device as set forth in claim 3 wherein said plates are circular disks, and said first and second enclosure means are cylinders each of which is threaded to one of said first and third plates and fastener means for fixing said first and third plates to said second plate respectively.

5. A device as set forth in claim 4 further having voltage protection means equal in number to the number of conductors for protecting against transient voltage; said protection means having first and second electrical sides and being mounted to said first plate such that the first side is electrically connected to said first plate; and the second side of each protection means being electrically connected respectively to one conductor inside said enclosure so as to shunt electrical energy from the conductor to the first plate when an over-voltage occurs.

6. A device as set forth in claim 1 further having voltage protection means equal in number to the number of conductors for protecting against transient voltage; said protection means having first and second electrical sides and being mounted to said first plate such that the first side is electrically connected to said first plate; and the second side of each protection means being electrically connected respectively to a different conductor inside said enclosure so as to shunt electrical energy from the conductor to the first plate when an over-voltage occurs.

* * * * *